US010128902B1

United States Patent
Cheung et al.

(10) Patent No.: US 10,128,902 B1
(45) Date of Patent: Nov. 13, 2018

(54) DEVICE, SYSTEM, AND METHOD FOR COEXISTENCE BASED FREQUENCY HOPPING

(71) Applicant: APPLE INC., Cupertino, CA (US)

(72) Inventors: David B. Cheung, Los Gatos, CA (US); Paul Flynn, Menlo Park, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 15/698,766

(22) Filed: Sep. 8, 2017

(51) Int. Cl.
  *H04B 7/06* (2006.01)
  *H04B 1/715* (2011.01)
  *H04B 7/08* (2006.01)
  *H04W 76/15* (2018.01)

(52) U.S. Cl.
  CPC ........... *H04B 1/715* (2013.01); *H04B 7/0805* (2013.01); *H04W 76/15* (2018.02); *H04B 2001/7154* (2013.01)

(58) Field of Classification Search
  CPC ...... H04B 7/04; H04B 7/0608; H04B 7/0689; H04B 7/0691
  USPC ........................................ 375/267, 295, 299
  See application file for complete search history.

(56) References Cited

U.S. PATENT DOCUMENTS

| | | | | |
|---|---|---|---|---|
| 2010/0330915 | A1* | 12/2010 | Parizhsky | H04B 7/0608 455/63.1 |
| 2013/0208668 | A1* | 8/2013 | Ramos | H04W 76/36 370/329 |
| 2014/0055077 | A1* | 2/2014 | Barrass | B60L 11/1803 318/700 |
| 2017/0093457 | A1* | 3/2017 | Jain | H04B 1/401 |

\* cited by examiner

*Primary Examiner* — Kevin Kim
(74) *Attorney, Agent, or Firm* — Fay Kaplun & Marcin, LLP

(57) ABSTRACT

Devices, systems, and methods utilize coexistence-based frequency hopping. Methods are performed at a user equipment including an antenna arrangement comprising a first plurality of antennas configured for use with a first connection and a second plurality of antennas configured for use with a second connection. The methods include determining, for each of a plurality of combinations of one of the first antennas and one of the second antennas, an individual expected interference limiting a number of usable channels for the first connection. The methods include determining a combined expected interference based at least in part on at least one of the individual expected interferences. The methods also include selecting, based at least in part on the combined expected interference, an operational antenna of the first plurality of antennas for communication associated with the first connection.

20 Claims, 7 Drawing Sheets

Policy Table
300

| Coexistence Policy Table | | | | | |
|---|---|---|---|---|---|
| Cell Band | BT Channel Mask (U-Cell) | | BT Channel Mask (L-Cell) | | |
| | U-BT | L-BT | U-BT | L-BT | |
| LTE Band A | CH 0-58 | CH 0-58 | None | CH 0-58 | ← 305 |
| LTE Band B | CH 0-58 | CH 0-20 | CH 0-20 | CH 0-58 | ← 310 |
| LTE Band C | CH 0-78 | CH 0-20 | CH 0-20 | CH 0-58 | ← 315 |
| LTE Band D | CH 0-58 | CH 0-20 | CH 0-20 | CH 0-78 | ← 320 |
| LTE Band E | CH 0-78 | CH 0-20 | CH 0-20 | CH 0-78 | ← 325 |
| ... | ... | ... | ... | ... | |
| | ↑ 330 | ↑ 335 | ↑ 340 | ↑ 345 | |

DEVICE, SYSTEM, AND METHOD FOR COEXISTENCE BASED FREQUENCY HOPPING

BACKGROUND INFORMATION

A user equipment (UE) may be configured with a variety of different wireless communications capabilities. For example, the UE may be capable of establishing a wireless connection with a cellular network. The cellular network may be of any type of network such as a Long Term Evolution (LTE) network, a 3G network, a 4G network, a 5G network, etc. In another example, the UE may be capable of establishing a wireless connection with a WiFi network. The WiFi network may also be of any type, such as a home WiFi network, a public access point, a HotSpot, etc. In a further example, the UE may be capable of establishing a wireless connection with another UE (e.g., a peer connection). This connection may be made using a short-range or mid-range communication protocol, such as a Bluetooth or WiFi connection.

The UE may be capable of utilizing these various communication capabilities for different applications and at varying times. Although the wireless connections being established for these different communication capabilities utilize respective ranges of frequencies or bandwidths (sometimes with an overlap), concurrent usage of two or more wireless connections may create interference. For example, a first wireless connection being used concurrently with a second wireless connection may create interference for the second wireless connection, or vice versa, or in both directions. Even with antenna diversity where a plurality of antennas is available to establish a first wireless connection, there may still be scenarios where the first wireless connection is interfered with by at least a second wireless connection. Specifically, where the first wireless connection is a Bluetooth connection, antenna diversity may introduce multiple Bluetooth antennas. Despite the Bluetooth protocol constantly checking for the best channels in which a communication over the Bluetooth connection may be performed, the interference from the other wireless connection(s) may result in a Bluetooth connection failing to establish or the communication over the Bluetooth connection failing to transmit/receive. Thus, the UE may be required to perform additional retransmission attempts, which may result in a lower link quality. Furthermore, these retransmissions required to compensate for packet loss due to the interference may result in the UE utilizing more power than necessary from a limited power supply.

SUMMARY

Some exemplary embodiments are directed to a method that includes, at a user equipment including an antenna arrangement comprising a first plurality of antennas configured for use with a first connection and a second plurality of antennas configured for use with a second connection: determining, for each of a plurality of combinations of one of the first antennas and one of the second antennas, an individual expected interference limiting a number of usable channels for the first connection; determining a combined expected interference based at least in part on at least one of the individual expected interferences; and selecting, based at least in part on the combined expected interference, an operational antenna of the first plurality of antennas for communication associated with the first connection.

Additional exemplary embodiments are directed to a user equipment that includes a transceiver configured to establish a first connection and a second connection; an antenna arrangement comprising a first plurality of antennas configured for use with a first connection and a second plurality of antennas configured for use with a second connection; and a processor determining, for each of a plurality of combinations of one of the first antennas and one of the second antennas, an individual expected interference limiting a number of usable channels for the first connection, the processor determining a combined expected interference based at least in part on at least one of the individual expected interferences, the processor selecting, based at least in part on the combined expected interference, an operational antenna of the first plurality of antennas for communication associated with the first connection.

Still other exemplary embodiments are directed to an integrated circuit that includes circuitry for determining, for each of a plurality of combinations of one of a first plurality of antennas configured for use with a first connection and one of a second plurality of antennas configured for use with a second connection, an individual expected interference limiting a number of usable channels for the first connection; circuitry for determining a combined expected interference based at least in part on at least one of the individual expected interferences; and circuitry for selecting, based at least in part on the combined expected interference, an operational antenna of the first plurality of antennas for communication associated with the first connection.

BRIEF DESCRIPTION OF THE DRAWINGS

FIG. 3 shows an example policy table of available channels according to various exemplary embodiments described herein.

DETAILED DESCRIPTION

Figure 1:
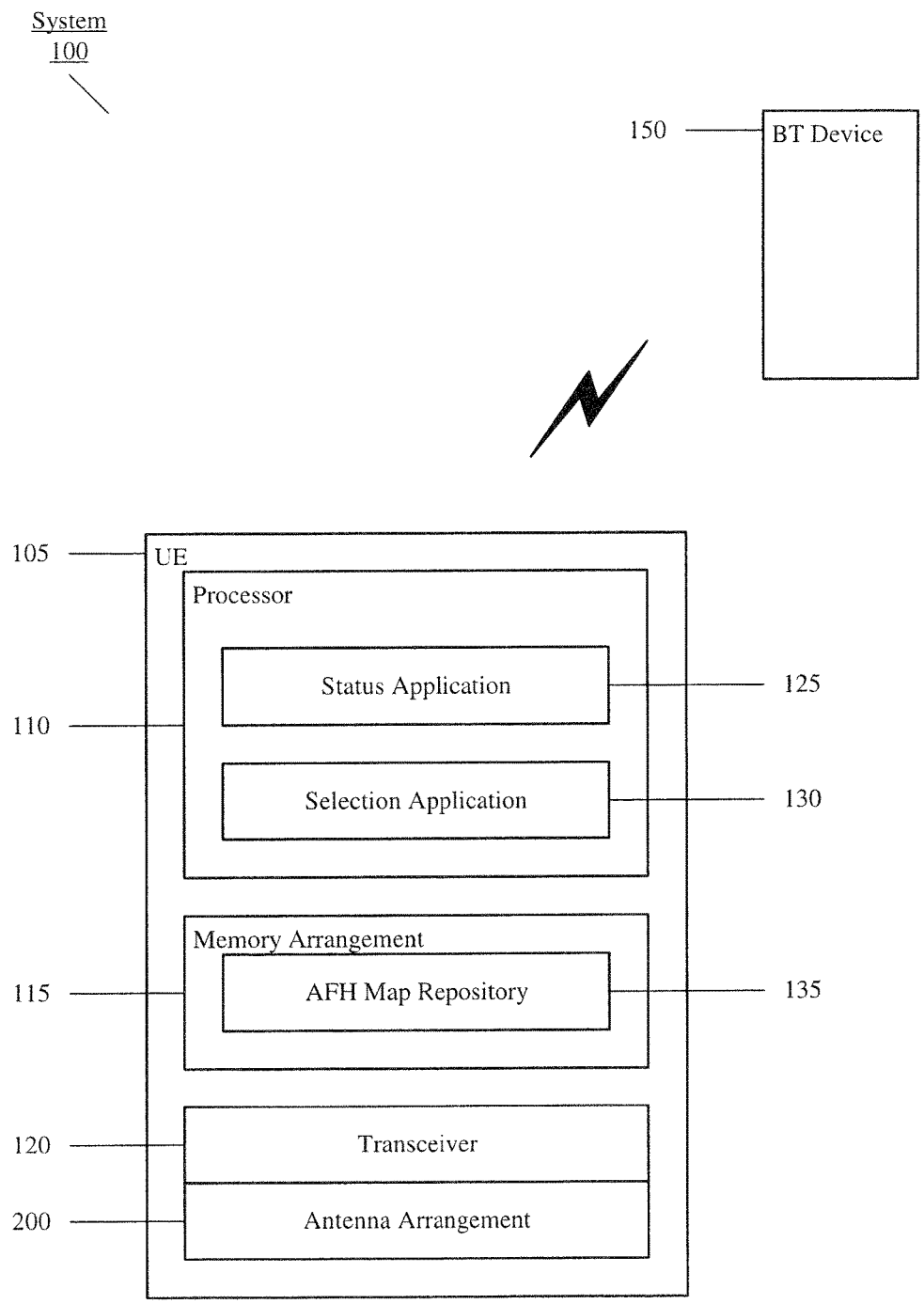
FIG. 1 shows an example system where a user equipment adaptively selects an antenna according to various exemplary embodiments described herein.

The exemplary embodiments may be further understood with reference to the following description and the related appended drawings, wherein like elements are provided with the same reference numerals. The exemplary embodiments are related to a device, system, and method for adaptively selecting an antenna of a user equipment (UE) for use in a data exchange over a wireless connection. Specifically, the wireless connection may be established with a short-range communication protocol, such as a Bluetooth connection. The UE may utilize an antenna diversity arrangement in which more than one Bluetooth antenna is available to exchange data over the wireless connection. The exemplary embodiments provide a mechanism by which the selection of the Bluetooth antenna used for transmission considers a current status of other wireless connections and corresponding antenna usage, such that available Bluetooth frequencies may be identified to select the Bluetooth antenna.

Initially, it should be noted that the exemplary embodiments are described herein with regard to an antenna selection for a Bluetooth connection. However, the use of a Bluetooth connection and performing the antenna selection for this wireless connection is only exemplary. The exemplary embodiments may be modified to be used with any type of wireless connection.

It should also be noted that the exemplary embodiments are described herein with regard to an antenna diversity arrangement (or mechanism) in which the Bluetooth connection may be established using one of two different antennas. However, the antenna diversity arrangement described with respect to two different antennas is only exemplary. The exemplary embodiments may be configured or modified to be used where the antenna diversity arrangement includes more than two antennas that are used in conjunction with the Bluetooth connection.

The exemplary embodiments relate to configurations where the UE may include two antennas that may be used to establish a Bluetooth connection. When the UE is only equipped with a single Bluetooth antenna (e.g., due to form factor reasons), any time that the Bluetooth connection is required, the UE selects the one available Bluetooth antenna and performs the wireless communication. Those skilled in the art will understand that other operations may be performed such as monitoring for a preferred Bluetooth channel over which the wireless communication is to be performed. However, with regard to antenna selection, the UE is not presented with an option and is only capable of utilizing the single Bluetooth antenna that is provided.

When the UE utilizes the Bluetooth connection and one or more other types of wireless connections (e.g., cellular, WiFi, GPS, etc.), a coexistence issue may arise where interference effects are introduced to one or more of the wireless connections. For example, the interference effects may include out-of-band emissions (e.g., from LTE bands 40($b$), 41, and/or 7, which are adjacent to the 2.4 GHz Bluetooth range), third order harmonics, intermodulation products, etc. These interference effects may interfere with the operations and functionality of the Bluetooth connection. When equipped with only a single Bluetooth antenna, the UE may be incapable of avoiding these interference issues.

One manner of decreasing the interference issues is by equipping the UE with a diversity antenna where two or more antennas may be available to establish the Bluetooth connection. However, when the UE is equipped with two Bluetooth antennas as well as be configured to utilize a diversity antenna for another wireless connection, the complexity with which antenna selection is performed increases. For example, the UE may be equipped with two or more antennas that may be available for further wireless connections (e.g., cellular, WiFi, etc.). For illustrative purposes, these antennas will be referred to herein as cellular antennas. However, it is noted that these antennas being used for a cellular connection is only exemplary and these antennas may be used for other types of wireless connections. It is also noted that as those skilled in the art will understand, a particular physical antenna may be capable of being used with one or more types of wireless connections.

With two cellular antennas and two Bluetooth antennas, there are at least four different antenna combinations that may be utilized (e.g., first cellular-first Bluetooth, first cellular-second Bluetooth, second cellular-first Bluetooth, and second cellular-second Bluetooth). Accordingly, the selection of the proper Bluetooth antenna is no longer a matter of only performing the other operations (e.g., monitoring the Bluetooth channels) but further includes the antenna selection to take advantage of the antenna diversity of having more than one Bluetooth antenna (e.g., to decrease interference issues and improve performance of the Bluetooth wireless connection).

With two Bluetooth antennas that are available to establish and maintain the Bluetooth connection, one manner of approaching the use of Bluetooth antenna diversity is that whenever a packet (or some wireless communication) is dropped over the Bluetooth connection using a first Bluetooth antenna, the UE is to switch to the other, second Bluetooth antenna, e.g., for a subsequent communication. This switching operation allows for the packet to be transmitted over the Bluetooth connection with an assumption that the second antenna is more likely to successfully transmit/receive the packet than the first antenna, the use of which just resulted in the unsuccessful transmission. Therefore, there is a clear advantage of initially selecting the second Bluetooth antenna (e.g., the antenna more likely to successfully complete the communication), because an improper selection would result in the increased probability of this switching function being used.

Therefore, where the UE has two (or more) Bluetooth antennas and two (or more) cellular antennas, the exemplary embodiments provide a mechanism where the UE dynamically adjusts the Bluetooth antenna switching policy based on expected cellular interference (e.g., from coexistence conditions). Specifically, based on the current cellular usage, the current WiFi usage, and/or the current GPS usage on the UE and usage of the antennas, the expected corresponding interference may be identified. The expected interference may provide a basis upon which the UE determines which of the available Bluetooth antennas is to be selected for use by the Bluetooth connection. As will be described in further detail below, the expected interference may be defined with adaptive frequency hopping (AFH) maps that indicate channels that the Bluetooth connection is to avoid due to the expected interference for each combination of antennas (e.g., Bluetooth antenna to cellular antenna). By instantiating AFH maps for the four different antenna combinations, an aggregate AFH map may be generated and used in conjunction with other considerations (e.g., an internal policy table) to properly select which Bluetooth antenna is to be used at any point in time. When the initial selection of the Bluetooth antenna is better, there may be decreased instances of dropped packets and use of the antenna switching function. However, even with the better selection, if a packet were to be dropped using the selected Bluetooth antenna, the exemplary embodiments may continue to select the same Bluetooth antenna. Alternatively, the exemplary embodiments may only perform an initial selection while the switching protocol may still be used where the other non-selected Bluetooth antenna is used.

FIG. 1 shows an example system 100 where a UE 105 adaptively selects a Bluetooth antenna according to various exemplary embodiments described herein. The system 100 includes the UE 105 that communicates over a Bluetooth connection with a Bluetooth device 150. For example, the UE 105 may be a portable device (e.g., cellular phone, a smartphone, a tablet, a phablet, laptop, a wearable, an Internet of Things (IoT) device, etc.) or a stationary device (e.g., a desktop terminal). The Bluetooth device 150 may be another portable or stationary device (e.g., another smartphone, an earpiece, a headset, a speaker, a display device, etc.).

The UE 105 may also operate on a variety of different frequencies or channels (e.g., ranges of contiguous frequencies). Specifically, the UE 105 may operate over channels corresponding to a Bluetooth connection, a cellular connection, a WiFi connection, etc. Accordingly, the UE 105 may include components that enable different radio access technologies and communication protocols. As shown in FIG. 1, the UE 105 may include a processor 110, a memory arrangement 115, and a transceiver 120 utilizing an antenna arrangement 200. The UE 105 may also include further components such as a display device, an input/output (I/O) device, and other components such as a portable power supply, an audio I/O device, etc.

The processor 110 may be configured to execute a plurality of applications of the UE 105. For example, the applications may include a web browser when connected to a communication network via the transceiver 120. Accordingly, data may be exchanged with the network. In another example, the applications may include an audio application where audio data is exchanged between the UE 105 and the Bluetooth device 150 over the Bluetooth connection. In yet another example, the applications may include a status application 125 that is configured to determine a status or monitor the wireless connections of the UE 105 as well as antenna usage. The status application 125 may determine whether the cellular connection and/or the WiFi connection is being used, and the manner in which either or both of these connections is being used. In a further example, the applications may include a selection application 130 that is configured to determine which of the Bluetooth antennas is to be selected for performing a data communication over the Bluetooth connection. The selection application 130 may receive an output from the status application 125 and utilize one or more AFH maps to identify Bluetooth channels that may be used based on expected interference to determine a corresponding Bluetooth antenna. Accordingly, the selection application 130 may generate an aggregate AFH map based on the AFH maps corresponding to the different antenna combinations under the conditions indicated by the status application 125.

The above noted applications being an application (e.g., a program) executed by the processor 110 is only exemplary. The applications may also be represented as components of one or more multifunctional programs, a separate incorporated component of the UE 105 or may be a modular component coupled to the UE 105, e.g., an integrated circuit with or without firmware. That is, the applications may be implemented in a variety of manners in hardware, software, firmware, or a combination thereof. In addition, in some UEs, the functionality described for the processor 105 may be split among multiple processors (e.g., a baseband processor and an applications processor). The exemplary embodiments may be implemented in any of these or other configurations of a UE.

According to one exemplary embodiment, the status application 125 and the selection application 130 may be implemented in the hardware, software, and/or firmware of the coexistence control and Bluetooth control mechanisms. For example, the coexistence control mechanism may utilize a hardware component where the AFH maps are provided per cellular band based on radio and/or coexistence measurements (e.g., on prototype units) (as described in further detail below). In another example, the coexistence control mechanism may utilize a software component where a managing operation is updated to support a plurality of AFH maps for the four combinations of antennas. The software component may also push the AFH maps to the Bluetooth control mechanism via a messaging operation. In a further example, the Bluetooth control mechanism may utilize a software component where AFH maps are pushed to Bluetooth firmware. In yet another example, the Bluetooth control mechanism may utilize a firmware component where dynamic antenna selection behavior may be based on the inputs such as the output of the status application 125.

The memory arrangement 115 may be a hardware component configured to store data related to operations performed by the UE 105. Specifically, the memory arrangement 115 may store measurements and/or tracking information of operations associated with wireless connections. The memory arrangement 115 may also include an AFH map repository 135. The AFH map repository 135 may include a plurality of AFH maps that correspond to one of the four combinations of cellular antennas and Bluetooth antennas (assuming two cellular antennas and two Bluetooth antennas). As will be described in further detail below, the selection application 130 may refer to any/all of the AFH maps stored in the AFH map repository 135 when determining which of the two Bluetooth antennas is to be selected for a data communication over the Bluetooth connection based on the output from the status application 125 regarding usage of wireless connections on the UE 105.

The AFH maps stored in the AFH map repository 135 may be determined in a variety of different manners. According to a first exemplary embodiment, the AFH maps may be information determined under laboratory or otherwise controlled conditions where measurements of interference may be determined. While being tested, various scenarios, conditions, setups, etc. may be used to determine the interference-related information for a particular combination of cellular antenna and Bluetooth antenna. Accordingly, as will be described in detail below, the example antenna arrangement 200 that includes two cellular antennas and two Bluetooth antennas may have a plurality of AFH maps under respective known conditions associated therewith where each AFH map defines one or more Bluetooth channels that are to be avoided, e.g., based on expected interference from the other wireless connections. When this first manner of determining the AFH maps is utilized, the AFH maps may apply to any common type of UE 105 (e.g., a particular model of UE). Therefore, the AFH maps may be general to all UEs of the same type. For illustrative purposes, the exemplary embodiments are described herein with regard to the AFH maps being determined based on this first exemplary embodiment.

According to a second exemplary embodiment, the one or more AFH maps may be based on information that is gathered while the UE 105 is being used. As those skilled in the art will understand, the processor 110 of the UE 105 may be configured with further applications and perform further operations that gather the interference-related information to generate the AFH maps. In this manner, the one or more AFH maps may be customized to the specific UE 105. According to a third exemplary embodiment, the one or more AFH maps may be generated from information determined based on a combination of the above manners. Thus, the UE 105 may be configured with one or more general AFH maps associated with the type of the UE 105 and subsequently modified to customize one or more of the general AFH maps for the specific UE 105.

The transceiver 120 may be a component of the UE 105 that enables communication with other devices over one or more communication pathways. Specifically, the transceiver 120 may enable wireless communications to be performed. As the exemplary embodiments relate to the UE 105, which is capable of a plurality of different types of wireless connections, the transceiver 120 may be equipped with one or more radios that are capable of performing wireless communications over a plurality of different wireless connections, including any/all of a Bluetooth connection, a cellular connection, a WiFi connection, a GPS connection, etc.

The antenna arrangement 200 may be any configuration of one or more antennas that enable the transceiver 120 to perform the wireless communications over the different wireless connections. Specifically, the antenna arrangement 200 may utilize an antenna diversity arrangement in which one or more antennas in the antenna arrangement 200 may be used by a particular wireless connection. As noted above, one exemplary antenna arrangement 200 may include two cellular antennas and two Bluetooth antennas.

Figure 2:
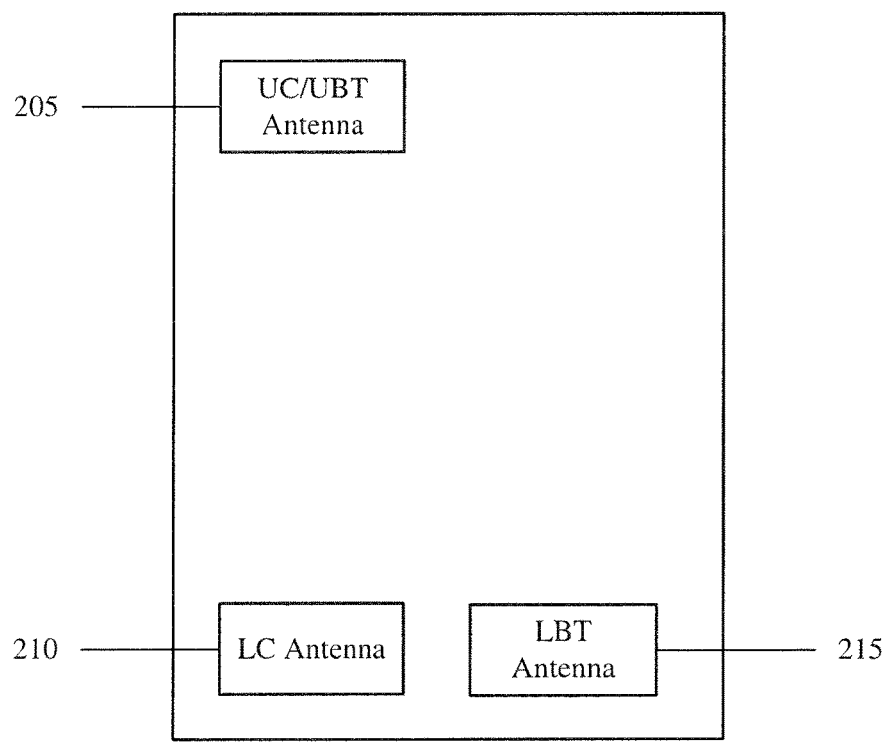
FIG. 2 shows the user equipment in the system of FIG. 1 that utilizes antenna diversity according to various exemplary embodiments described herein.

FIG. 2 shows the example UE 105 in the system 100 of FIG. 1 that utilizes antenna diversity in the antenna arrangement 200, according to various exemplary embodiments described herein. Specifically, as illustrated, the antenna arrangement 200 may include three antennas: an upper antenna 205 that may be used for both the cellular and Bluetooth connections using a single antenna or collocated cellular and Bluetooth antennas, a first lower antenna 210 configured for the cellular connection (hereinafter referred to as "lower cellular antenna"), and a second lower antenna 215 configured for the Bluetooth connection (hereinafter referred to as "lower Bluetooth antenna"). Since the upper antenna 205 is configured for both the cellular and Bluetooth connections (e.g., using orthogonality), when the upper antenna 205 is used for the cellular connection, the upper antenna 205 is referred to hereinafter as "upper cellular antenna" and when the upper antenna 205 is used for the Bluetooth connection, the upper antenna 205 is referred to hereinafter as "upper Bluetooth antenna". Accordingly, the antenna arrangement 200 including the three antennas 205, 210, 215 may provide two cellular antennas and two Bluetooth antennas. The exemplary antenna arrangement 200 is described as including three physical antennas, but may be used as a four antenna arrangement including two Bluetooth antennas and two cellular antennas. As those skilled in the art will understand, the physical antennas may not define the total number of antennas available to establish the different wireless connections as one physical antenna may be used for two or more wireless connections (e.g., the upper antenna 205).

It is noted that the first and second Bluetooth antennas are referred to herein as the upper and lower Bluetooth antennas and the first and second cellular antennas are referred to herein as the upper and lower cellular antennas. However, the relative disposition of the Bluetooth and cellular antennas in the UE 105 is only exemplary. That is, the first and second Bluetooth/cellular antennas may be positioned at any relative location. For example, in another exemplary manner of arranging the antenna arrangement 200, a first Bluetooth antenna and a first cellular antenna may be disposed on a left edge while a second Bluetooth antenna and a second cellular antenna may be disposed on an opposite right edge. Therefore, the upper and lower dispositions utilized herein is exemplary only and any relative orientation and configuration may be used. In another example, the antenna arrangement 200 may be arranged with interior and exterior antennas.

According to the exemplary embodiments, the UE 105 may be configured to adaptively select the Bluetooth antenna between the upper Bluetooth antenna and the lower Bluetooth antenna to improve the manner in which wireless communications are performed over the Bluetooth connection. Specifically, as described above, the UE 105 may be preconfigured with one or more AFH maps defining Bluetooth channels that are to be avoided (or that can be used) for a given combination of Bluetooth and cellular antennas. By incorporating the information from the different combinations, the UE 105 may generate an aggregate AFH map that defines which Bluetooth channels are to be avoided (or which are to be used). For example, the aggregate AFH map may determine an aggregation of Bluetooth channels to be avoided where any one combination may eliminate a possible Bluetooth channel. The information of the AFH maps from the combinations may also define which Bluetooth antenna to use, particularly when the resulting available Bluetooth channels from the AFH maps of the combinations do not have a predetermined minimum number of available channels (e.g., at least 20 Bluetooth channels).

Therefore, the aggregate AFH map defines which of the Bluetooth channels are available for use under the current conditions. By narrowing the available Bluetooth channels, there may be scenarios where the antenna selection may be forced to the upper Bluetooth antenna or to the lower Bluetooth antenna under the current conditions. Even by narrowing the available Bluetooth channels, there may be other scenarios where the antenna selection may still be optional and either of the Bluetooth antennas may be available for use under the current conditions. The range of channels that are to be monitored with the other operations of performing the wireless communications over the Bluetooth connection may be narrowed to decrease any unnecessary power consumption. Exemplary scenarios will be described in further detail below.

It is noted that the UE 105 may utilize the Bluetooth antenna selection mechanism according to the exemplary embodiments at various times. For example, the UE 105 may update the AFH maps being used at predetermined intervals (e.g., once per second, once every five seconds, etc.). In this manner, the UE 105 may continuously monitor the status/current conditions of the wireless connections and interference issues surrounding the UE 105 so that a selection of the Bluetooth antenna may be made whenever required. In another example, the UE 105 may update the AFH maps when the Bluetooth communication functionality is needed. In a further example, the UE 105 may update the AFH maps based on a combination of the above manners.

As noted above, the UE 105 may also be configured with further considerations when adaptively selecting the Bluetooth antenna. Specifically, the UE 105 may utilize a coexistence policy table. The policy table may be loaded or preconfigured with the Bluetooth software/hardware/firmware. Alternatively, the policy table may be stored in the memory arrangement 115. The policy table may define available channels based on an antenna combination and a selected cellular band being used. It is also noted that if enabled, the GPS frequencies being used may also be included in the policy table.

FIG. 3 shows an exemplary policy table 300 of available channels according to various exemplary embodiments described herein. It is noted that the policy table 300 is only exemplary and the available channels that are indicated are also only exemplary. As illustrated in FIG. 3, rows 305-325 may indicate the selected cellular band while columns 330-345 may indicate the antenna combination. Specifically, the row 305 is for a first LTE band A, the row 310 is for a second LTE band B, the row 315 is for a third LTE band C, the row 320 is for a fourth LTE band D, and the row 325 is for a fifth LTE band E. In other implementations, the policy table 300 may include more, fewer, and/or different rows. For example, the policy table 300 may include further rows of further LTE bands. In another example, the policy table 300 may include further rows for other types of cellular bands (e.g., 3G, 4G, 5G, etc.). The columns 330, 335 may relate to when the upper cellular antenna is being used. Thus, column 330 may be for the antenna combination of the upper cellular antenna and the upper Bluetooth antenna. The column 335 may be for the antenna combination of the upper cellular antenna and the lower Bluetooth antenna. The columns 340, 345 may relate to when the lower cellular antenna is being used. Thus, column 345 may be for the antenna combination of the lower cellular antenna and the upper Bluetooth antenna. The column 345 may be for the antenna combination of the lower cellular antenna and the lower Bluetooth antenna.

In the exemplary policy table 300, the available range of Bluetooth channels may include 79 total channels from 0 to 78. Accordingly, the policy table 300 may define the channels that are blocked from this total channel range within the cells of the policy table 300 (an intersection between the rows 305-325 and the columns 330-345). In a first example, the cell corresponding to the LTE band A and the upper cellular and upper Bluetooth antenna combination indicates that channels 0 to 58 are blocked. In a second example, the cell corresponding to the LTE band E and the upper cellular and upper Bluetooth antenna combination indicates that channels 0 to 78 are blocked. In a third example, the cell corresponding to the LTE band C and the upper cellular and lower Bluetooth antenna combination indicates that channels 0 to 20 are blocked. In a fourth example, the cell corresponding to the LTE band A and the lower cellular and upper Bluetooth antenna combinations indicates that no channels are blocked. Accordingly, the information of the policy table 300 may also provide information that is used in generating the aggregate AFH map that defines the available Bluetooth channels for use under current conditions based on expected interference as indicated in the AFH maps for the different antenna combinations.

It is again noted that the policy table 300 may consider the specific cellular frequencies being used as described above, but may further consider the GPS frequencies being used. Specifically, an entire LTE band may cover a wide set of frequencies, but a much smaller set may be used by a particular cellular provider. It is also noted that the determination of the channels to be blocked as indicated in the cells of the policy table 300 may be dynamically calculated using predetermined formulas.

FIGS. 4-9 show a plurality of scenarios 400-900 in which a Bluetooth antenna is adaptively selected based on current conditions associated with wireless connections and antenna usage according to various exemplary embodiments described herein. The scenarios 400-900 relate to when the predetermined minimum number of available Bluetooth channels that is to be set is at least 20. Thus, when a particular combination has a number of available Bluetooth channels that is less than this predetermined minimum number, this may indicate a poor antenna combination and a configuration that should be avoided. As described above, the scenarios 400-900 may relate to having four different antenna combinations of (1) upper cellular with upper Bluetooth, (2) lower cellular with upper Bluetooth, (3) upper cellular with lower Bluetooth, and (4) lower cellular with lower Bluetooth. The scenarios 400-900 may additionally consider other types of wireless connections that may contribute to the interference issues. As will be described in detail below, one such wireless connection may be a WiFi connection and expected interference issues associated therewith. The scenarios 400-900 are described with consideration of a WiFi connection as well (when applicable). The AFH maps included in each of the scenarios 400-900 are shown where grayed sections represent poor Bluetooth channels to be avoided due to the corresponding interference.

Figure 4:
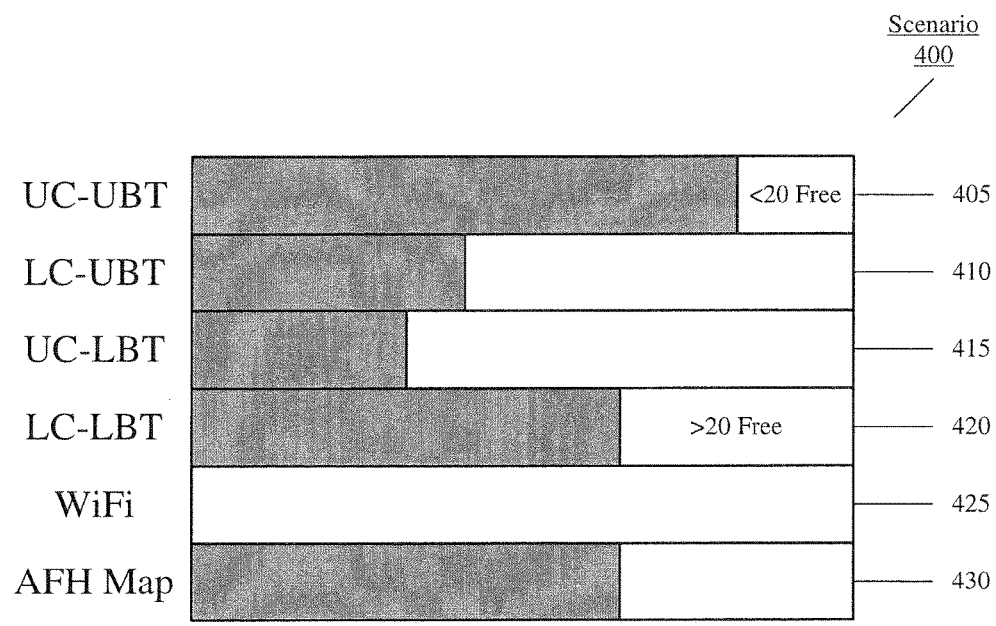
FIGS. 4-9 show a plurality of example scenarios in which an antenna is adaptively selected based on current conditions according to various exemplary embodiments described herein.

In FIG. 4, the scenario 400 may relate to when there is no WiFi interference but significant cellular interference. As shown, a first AFH map 405 of the antenna combination including the upper cellular antenna and the upper Bluetooth antenna has significant cellular interference where less than 20 Bluetooth channels are available. That is, if the upper cellular antenna and the upper Bluetooth antenna were to be used, less than 20 Bluetooth channels may be available that are not impacted by the cellular interference. A second AFH map 410 of the antenna combination including the lower cellular antenna and the upper Bluetooth antenna, a third AFH map 415 of the antenna combination including the upper cellular antenna and the lower Bluetooth antenna, and a fourth AFH map 420 of the antenna combination including the lower cellular antenna and the lower Bluetooth antenna all reflect substantially less cellular interference than the first AFH map 405. Again, the fifth AFH map 425 relates to interference resulting from the WiFi connection. Accordingly, the aggregate AFH map 430 may be generated based on the AFH maps 405-425.

Although the aggregate AFH map 430 considers all the AFH maps 405-425, the aggregate AFH map 430 may be a combination of the AFH maps 410-425. That is, the AFH map 405 may be interpreted as an antenna combination to be avoided as usage of the upper Bluetooth antenna while concurrently using the upper cellular antenna results in an insufficient number of available Bluetooth channels (e.g., less than 20, although any other threshold can be applied). Thus, the aggregate AFH map 430 may be generated based on the AFH maps 410-425, while excluding the AFH map 405 that would be infeasible. Accordingly, the aggregate AFH map 430 is generated based on viable worst case. When determining which of the Bluetooth antennas to be adaptively selected, information from all the AFH maps 405-425 may still be considered while using the aggregate AFH map 430. For example, the UE 105 may select either of the Bluetooth antennas, since there is at least one combination including the upper Bluetooth antenna and at least one combination including the lower Bluetooth antenna for which the set of available Bluetooth channels satisfies the predetermined minimum number. However, the better selection of the Bluetooth antenna may be the lower Bluetooth antenna since the upper cellular antenna being used creates the above noted significant interference condition. Accordingly, based on the cellular antenna that is being used, for wireless communications over the Bluetooth connection, the UE 105 may either be provided an option to select the initial Bluetooth antenna when the upper cellular antenna is not being used or be forced to select the lower Bluetooth antenna when the upper cellular antenna is being used. When provided an option, the UE 105 may utilize any available mechanism to determine which of the Bluetooth antennas to select.

Figure 5:
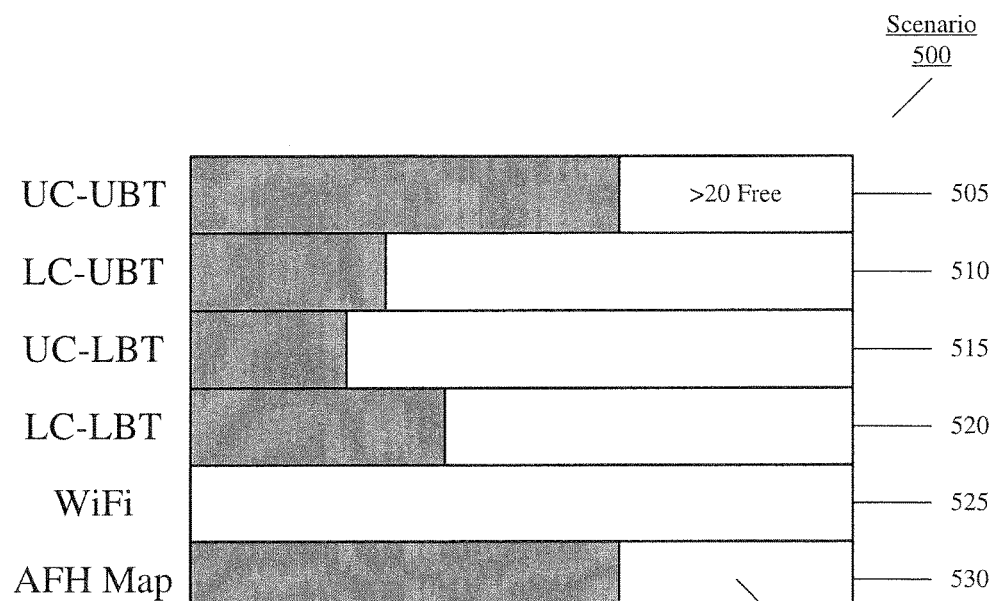

In FIG. 5, the scenario 500 may relate to when there is no WiFi interference and only moderate cellular interference. Thus, in contrast to the scenario 400, all the antenna combinations may identify available Bluetooth channels that satisfy the predetermined minimum number. As shown, a first AFH map 505 of the antenna combination including the upper cellular antenna and the upper Bluetooth antenna has the most cellular interference, but still has at least 20 Bluetooth channels available. A second AFH map 510 of the antenna combination including the lower cellular antenna and the upper Bluetooth antenna, a third AFH map 515 of the antenna combination including the upper cellular antenna and the lower Bluetooth antenna, and a fourth AFH map 520 of the antenna combination including the lower cellular antenna and the lower Bluetooth antenna all reflect substantially less cellular interference than the first AFH map 505. The fifth AFH map 525 relates to interference, which is not present, resulting from the WiFi connection. Accordingly, the aggregate AFH map 530 may be generated based on the AFH maps 505-525.

In this instance, the aggregate AFH map 530 may be a combination of all the AFH maps 505-525. That is, all the AFH maps 505-525 may be interpreted as indicating that any antenna combination may be used. Accordingly, the aggregate AFH map 530 is generated based on overall worst case. In the present example, the Bluetooth channels 535 shown in the aggregate AFH map 530 that can be used for any antenna combination correspond to the Bluetooth channels that are available for use in AFH map 505. When determining which of the Bluetooth antennas to be adaptively selected, information from all the AFH maps 505-525 may again be considered while using the aggregate AFH map 530. For example, the UE 105 may select either of the Bluetooth antennas since both combinations including the upper Bluetooth antenna and both combinations including the lower Bluetooth antenna satisfy the predetermined minimum number for available Bluetooth channels. Accordingly, the UE 105 may be provided with an option to select the initial Bluetooth antenna for wireless communications over the Bluetooth connection regardless of the cellular antenna that is being used.

Figure 6:
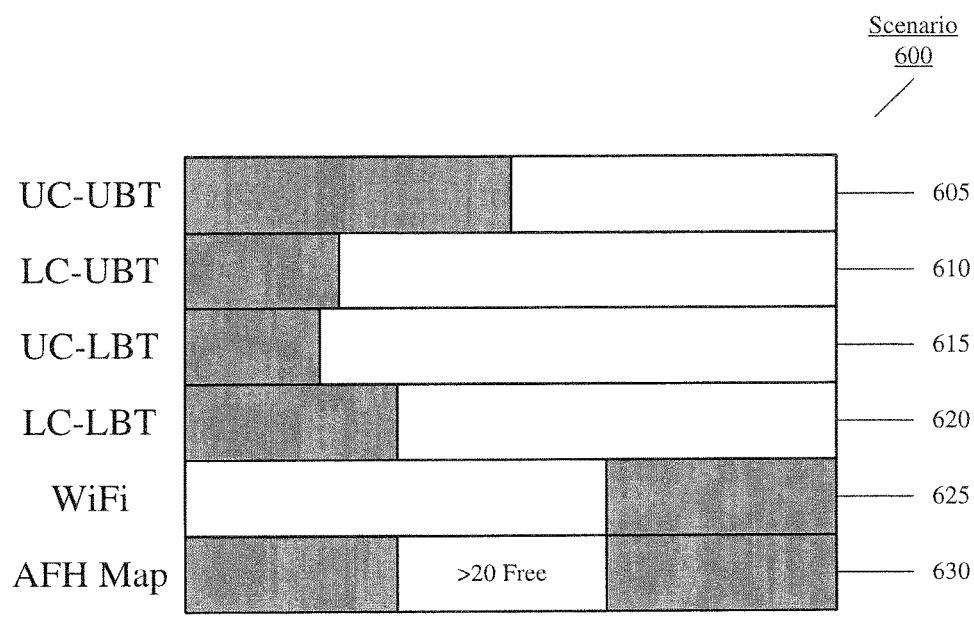

In FIG. 6, the scenario 600 may relate to when there is moderate WiFi interference and moderate cellular interference. As shown, a first AFH map 605 of the antenna combination including the upper cellular antenna and the upper Bluetooth antenna has moderate cellular interference, but at least 20 Bluetooth channels are still available. A second AFH map 610 of the antenna combination including the lower cellular antenna and the upper Bluetooth antenna, a third AFH map 615 of the antenna combination including the upper cellular antenna and the lower Bluetooth antenna, and a fourth AFH map 620 of the antenna combination including the lower cellular antenna and the lower Bluetooth antenna all have less cellular interference than the first AFH map 605. The fifth AFH map 625 relates to interference resulting from the WiFi connection and shows moderate WiFi interference (e.g., on an opposite end of the spectrum of available Bluetooth channels relative to a side corresponding to the cellular interference). Accordingly, the aggregate AFH map 630 may be generated based on the AFH maps 605-625.

Despite the cellular interference only being moderate for the AFH map 605, when incorporating the WiFi interference from the AFH map 625, the aggregate AFH map 630 may be a combination of the AFH maps 610-625. That is, the AFH map 605 may be interpreted as an antenna combination to be avoided as usage of the upper Bluetooth antenna while concurrently using the upper cellular antenna results in an insufficient number of available Bluetooth channels (less than 20) when also incorporating the WiFi interference. Thus, the aggregate AFH map 630 may be generated based on the AFH maps 610-625 while excluding the AFH map 605. Accordingly, the aggregate AFH map 630 is generated based on a viable worst case, which permits operation under three of the possible antenna combinations. In this manner, the WiFi interference may effectively provide a priority interference consideration over the cellular interference. For example, the WiFi interference may be an external interference that is expected or required to be avoided by a communication regulation (e.g., as defined by the European Telecommunications Standards Institute (ETSI)). When determining which of the Bluetooth antennas to be adaptively selected, information from all the AFH maps 605-625 may be considered while using the aggregate AFH map 630. For example, the UE 105 may select either of the Bluetooth antennas since there is at least one combination including the upper Bluetooth antenna and at least one combination including the lower Bluetooth antenna where the available Bluetooth channels satisfies the predetermined minimum number. However, the better selection of the Bluetooth antenna may be the lower Bluetooth antenna since the upper cellular antenna being used creates the above noted significant interference condition. Accordingly, the Bluetooth antenna selection may be based on the cellular status, such that the UE 105 may either have the option to select either Bluetooth antenna when the upper cellular antenna is not being used or be forced to select the lower Bluetooth antenna when the upper cellular antenna is being used.

Figure 7:
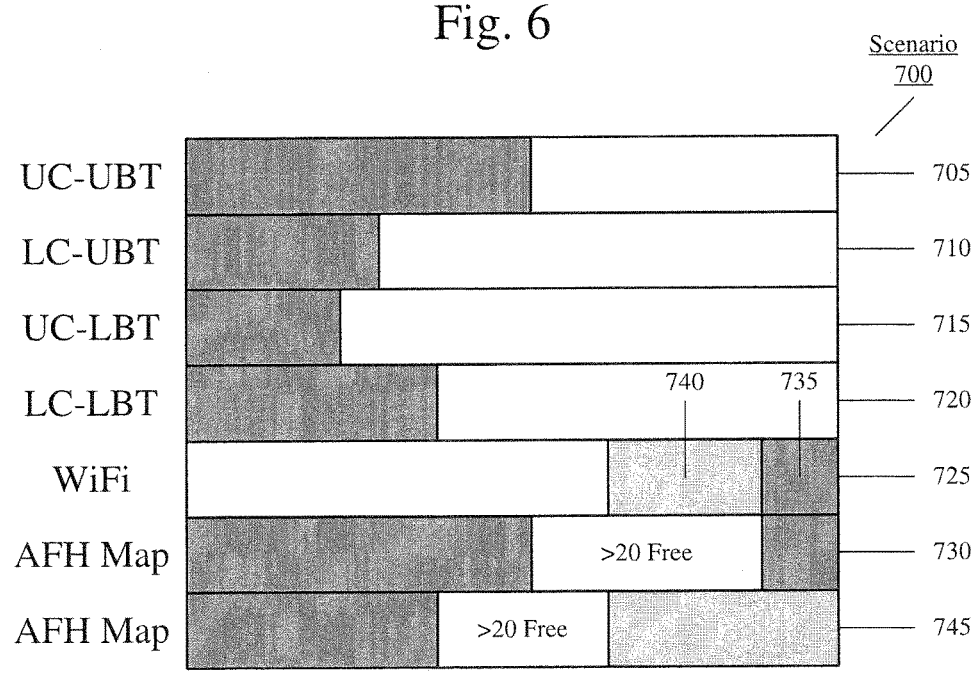

In FIG. 7, the scenario 700 may relate to an instance when there is moderate to low WiFi interference and moderate cellular interference. As shown, a first AFH map 705 of the antenna combination including the upper cellular antenna and the upper Bluetooth antenna has moderate cellular interference but at least 20 Bluetooth channels are still available. A second AFH map 710 of the antenna combination including the lower cellular antenna and the upper Bluetooth antenna, a third AFH map 715 of the antenna combination including the upper cellular antenna and the lower Bluetooth antenna, and a fourth AFH map 720 of the antenna combination including the lower cellular antenna and the lower Bluetooth antenna all have less cellular interference than the first AFH map 705. The fifth AFH map 725 relates to interference resulting from the WiFi connection and shows low WiFi interference from blocked Bluetooth channels 735 (and alternatively moderate WiFi interference if additionally considering blocked Bluetooth channels 740). Accordingly, the aggregate AFH map 730 may be generated based on the AFH maps 705-725.

In the instance of low WiFi interference, the aggregate AFH map 730 may be a combination of the AFH maps 705-725. That is, all the AFH maps 705-725 may be interpreted as an antenna combination that may be used. Accordingly, the aggregate AFH map 730 is generated based on an overall worst case. When determining which of the Bluetooth antennas to be adaptively selected, information from all the AFH maps 705-725 may again be considered while using the aggregate AFH map 730. For example, the UE 105 may select either of the Bluetooth antennas since both combinations including the upper Bluetooth antenna and both combinations including the lower Bluetooth antenna satisfy the predetermined minimum number for available Bluetooth channels, even when the presence of low WiFi interference is considered, as reflected by the blocked Bluetooth channels 735. Accordingly, the UE 105 may be provided with an option to select the initial Bluetooth antenna for wireless communications over the Bluetooth connection, regardless of the cellular antenna that is being used.

However, if the WiFi interference increases from low to moderate, as reflected by the blocked Bluetooth channels 740, the scenario 700 becomes substantially similar to the scenario 600. Specifically, the AFH map 705 may be interpreted as an antenna combination to be avoided as usage of the upper Bluetooth antenna while concurrently using the upper cellular antenna results in an insufficient number of available Bluetooth channels (less than 20) when also incorporating the moderate WiFi interference. Thus, an aggregate AFH map 745 may be generated based on the AFH maps 710-725 while excluding the AFH map 705. Accordingly, the aggregate AFH map 745 is generated based on viable worst case. When determining which of the Bluetooth antennas to be adaptively selected, information from all the AFH maps 705-725 may be considered while using the aggregate AFH map 745. For example, the UE 105 may select either of the Bluetooth antennas since there is at least one combination including the upper Bluetooth antenna and at least one combination including the lower Bluetooth antenna where the available Bluetooth channels satisfies the predetermined minimum number. However, the better selection of the Bluetooth antenna may be the lower Bluetooth antenna since the upper cellular antenna being used creates the above noted significant interference condition. Accordingly, based on the cellular antenna that is being used, for wireless communications over the Bluetooth connection, the UE 105 may either be provided an option to select the initial Bluetooth antenna when the upper cellular antenna is not being used or be forced to select the lower Bluetooth antenna when the upper cellular antenna is being used.

Figure 8:

In FIG. 8, the scenario 800 may relate to an instance when there is significant WiFi interference and moderate cellular interference. As shown, a first AFH map 805 of the antenna combination including the upper cellular antenna and the upper Bluetooth antenna has moderate cellular interference, but at least 20 Bluetooth channels are still available. A second AFH map 810 of the antenna combination including the lower cellular antenna and the upper Bluetooth antenna, a third AFH map 815 of the antenna combination including the upper cellular antenna and the lower Bluetooth antenna, and a fourth AFH map 820 of the antenna combination including the lower cellular antenna and the lower Bluetooth antenna all have less cellular interference than the first AFH map 805. The fifth AFH map 825 relates to interference resulting from the WiFi connection and shows significant WiFi interference. Accordingly, the aggregate AFH map 830 may be generated based on the AFH maps 805-825.

Despite the cellular interference only being moderate for the AFH maps 805, 810, and 820, when incorporating the WiFi interference from the AFH map 825, the combined interference may also create conditions where the number of available Bluetooth channels does not satisfy the predetermined threshold. However, the AFH map 815 and the AFH map 825 (which may be required to be considered based on regulatory standards) form a combination that permits the predetermined minimum number of available Bluetooth channels to be met. Therefore, the aggregate AFH map 830 may be a combination of the AFH maps 815 and 825. That is, the AFH maps 805, 810, 820 may be interpreted as antenna combinations to be avoided as usage of the corresponding antenna combinations each result in an insufficient number of available Bluetooth channels (e.g., less than 20) when also incorporating the WiFi interference. Thus, the aggregate AFH map 830 may be generated based on the AFH maps 815, 825 excluding the AFH maps 805, 810, 820. Accordingly, the aggregate AFH map 830 is generated based on a viable worst case. When determining which of the Bluetooth antennas to be adaptively selected, information from all the AFH maps 805-825 may be considered while using the aggregate AFH map 830. For example, the better selection of the Bluetooth antenna may be the lower Bluetooth antenna since using the upper Bluetooth antenna with either the upper cellular or lower cellular antenna results in a poorer condition (e.g., significant interference). Although the lower Bluetooth antenna being used with the upper cellular antenna may also result in poor performance, based on probability, use of the lower Bluetooth antenna may result in an overall better condition and even creates an acceptable condition where the predetermined minimum number of available Bluetooth channels become available. Accordingly, for wireless communications over the Bluetooth connection in the scenario 800, the UE 105 may be forced to select the lower Bluetooth antenna at all times.

Figure 9:

In FIG. 9, the scenario 900 may relate to an instance when there is significant WiFi interference and moderate cellular interference. As shown, a first AFH map 905 of the antenna combination including the upper cellular antenna and the upper Bluetooth antenna reflects moderate cellular interference, but at least 20 Bluetooth channels are still available. A second AFH map 910 of the antenna combination including the lower cellular antenna and the upper Bluetooth antenna, a third AFH map 915 of the antenna combination including the upper cellular antenna and the lower Bluetooth antenna, and a fourth AFH map 920 of the antenna combination including the lower cellular antenna and the lower Bluetooth antenna all reflect less cellular interference than the first AFH map 905. The fifth AFH map 925 relates to interference resulting from the WiFi connection and shows significant WiFi interference. Accordingly, the aggregate AFH map 930 may be generated based on the AFH maps 905-925.

Despite the cellular interference only being moderate for the AFH maps 905, 910, 915, and 920, when incorporating the WiFi interference from the AFH map 925, the total interference may create conditions where the available Bluetooth channels do not satisfy the predetermined minimum number. As shown, the WiFi interference is so significant that the predetermined minimum number of available Bluetooth channels (e.g., 20) is satisfied only when there is no cellular interference. Therefore, the aggregate AFH map 930 may be based only on the AFH map 925. That is, the AFH maps 905-920 may be interpreted as an antenna combination to be avoided as usage of the corresponding antenna combination results in an insufficient number of available Bluetooth channels (e.g., less than 20) when also incorporating the WiFi interference. Thus, the aggregate AFH map 930 may be generated based on the AFH map 925 excluding the AFH maps 905-920. Accordingly, the aggregate AFH map 930 is generated based on a viable worst case. When determining which of the Bluetooth antennas to be adaptively selected, information from all the AFH maps 905-925 may be considered while using the aggregate AFH map 930. For example, the better selection of the Bluetooth antenna may be forcing a selection to a default Bluetooth antenna as there are no antenna combinations that result in the predetermined minimum number of available Bluetooth channels being met. Accordingly, for wireless communications over the Bluetooth connection in the scenario 900, the UE 105 may be forced to select the default Bluetooth antenna (which may be either the upper or lower Bluetooth antenna as may be predetermined or preconfigured).

It is noted that the scenarios 400-900 described above relate to particular examples that the UE 105 may face from wireless connections and resulting interference issues. Although the scenarios 400-900 are relatively specific samples, the scenarios 400-900 may be representative of generalized current conditions being experienced by the UE 105. For example, the scenarios 400, 600 may be when only one AFH map is omitted from generating the aggregate AFH map and providing a condition when an option is removed and a forced selection is used. The scenarios 500, 700 may be representative of circumstances when no AFH is omitted and the option of selecting either Bluetooth antenna is available throughout. The scenario 800 may be representative of circumstances when more than one AFH map is omitted from generating the aggregate AFH map and a selection of which Bluetooth antenna to use is forced throughout. The scenario 900 may be representative of circumstances when all cellular AFH maps are omitted from generating the aggregate AFH map and a selection of which Bluetooth antenna to use is forced throughout. As the scenarios 400-900 are only exemplary, there may also be further scenarios that may be covered by the exemplary embodiments. For example, the WiFi interference may cover the entire range of Bluetooth channels or the interference results in no range of Bluetooth channels that have the predetermined minimum number of available Bluetooth channels. In such a scenario, the same mechanism as used in the scenario 900 may be utilized if a selection of a Bluetooth antenna is to be performed. Furthermore, in some circumstances, interference from another source, such as an NFC or Zigbee radio, may also be factored into generation of the aggregate AFH map, e.g., in addition to or in place of one or more of the other AFH maps.

Using the above described exemplary selection mechanisms, the exemplary embodiments provide a mechanism through which an improved selection of the Bluetooth antenna (initially or persistently) for use in wireless communications over the Bluetooth connection may be made. Based on expected interference issues from other wireless connections (e.g., cellular and/or WiFi), the UE may identify available Bluetooth channels or conditions that define the available set of Bluetooth channels. As cellular antennas are dynamically tuned (e.g., tuning to a specific cellular band if cellular active), a coexistence policy table may provide Bluetooth channel availability information and the UE may also monitor varying levels of degraded performance depending on the cellular band. When one of the Bluetooth antennas (e.g., the upper Bluetooth antenna) is capable of being dynamically tuned, retuning issues may arise and cause problems with the Bluetooth connection. However, by continuously selecting the expected better Bluetooth antenna, these issues may also be avoided or reduced.

Figure 10:
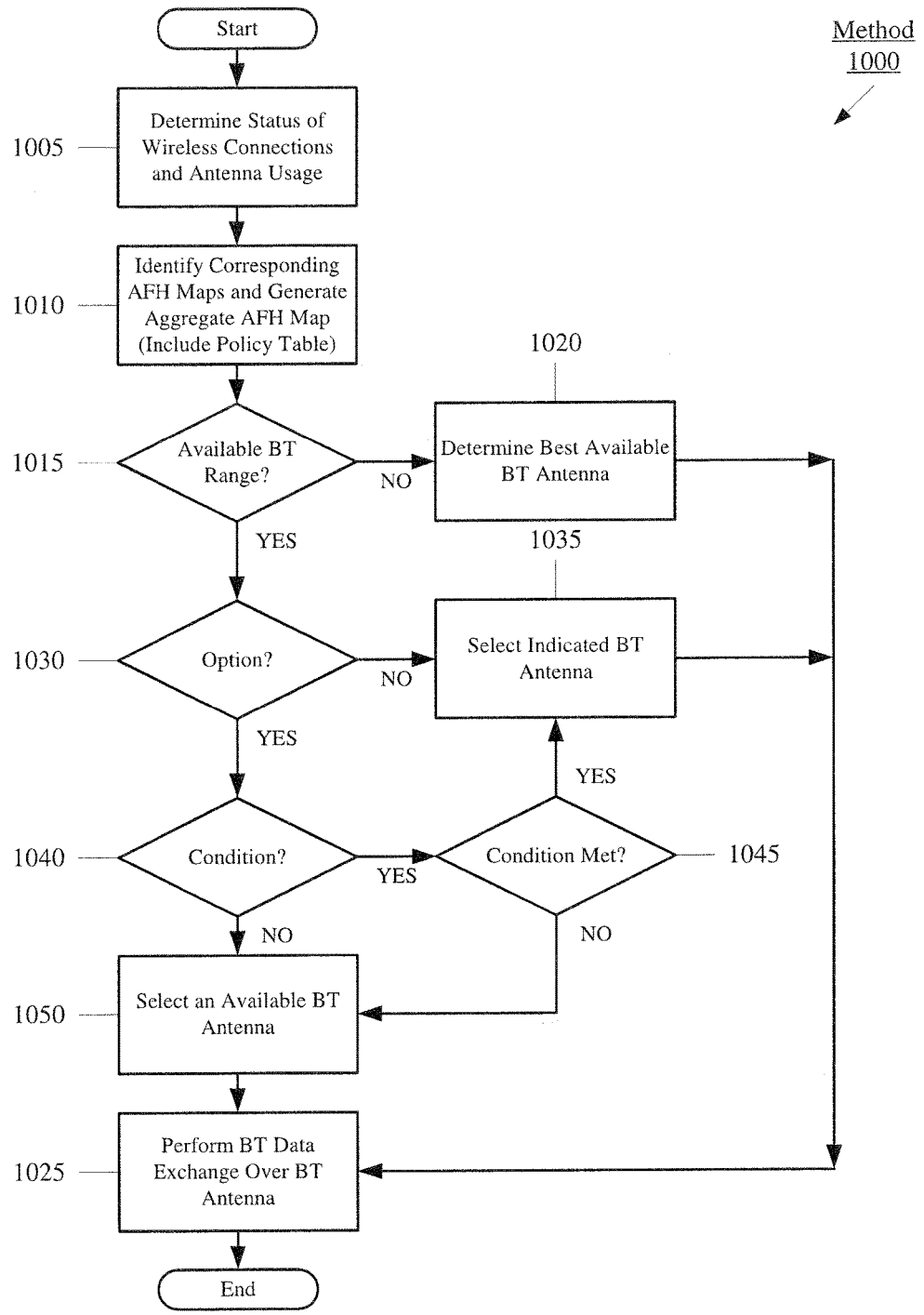
FIG. 10 shows an example method for adaptively selecting an antenna according to various exemplary embodiments described herein.

FIG. 10 shows an example method 1000 for adaptively selecting an antenna according to various exemplary embodiments described herein. The method 1000 may relate to how the UE 105 determines which Bluetooth antenna to select to provide a higher probability of good performance, based on a status of wireless connections and antenna usage from current conditions surrounding the UE 105 (as well as further considerations such as the policy table 300). The method 1000 is performed by the UE 105 and will be described with regard to the system 100 of FIG. 1, the antenna arrangement 200 of FIG. 2, the policy table 300 of FIG. 3, and the scenarios 400-900 of FIGS. 4-9.

In 1005, the UE 105 determines a status of the wireless connection and the corresponding antenna usage. As described above, the UE 105 may utilize the status application 125 to monitor the UE's one or more wireless connections and track the corresponding antenna usage. The UE 105 may determine whether the cellular connection and/or the WiFi connection are being used as well as the antennas (e.g., which cellular antenna) that are being used.

In 1010, the UE 105 identifies the corresponding AFH maps, e.g., stored in the AFH map repository 135. Based on the wireless connections and antenna usage, the AFH maps that associate the expected interference may define (or otherwise indicate) one or more Bluetooth channels that are to be avoided for a given antenna combination, e.g., of the Bluetooth antennas and the cellular antennas. In this manner, the UE 105 may identify the AFH maps (e.g., four AFH maps) corresponding to each of the antenna combinations. Additionally, if a WiFi connection is being used, the UE 105 may also identify an AFH map corresponding to the expected interference caused by the WiFi connection. As noted above, the WiFi connection may introduce an external interference that is to be avoided for purposes of performing wireless communications over the Bluetooth connection. Based on the identified AFH maps, the UE 105 may generate the aggregate AFH map. It is noted that the source of the WiFi interference may not be the WiFi usage on the UE 105. That is, even if the WiFi connection on the UE 105 is not being used, there may still be WiFi signals and/or other interference in the unlicensed 2.4 (and/or 5) GHz WiFi band. For example, the source of the interference in the WiFi band may arise from any RF source, such as microwave ovens, cordless phones, baby monitors, etc. The exemplary embodiments may be configured to identify and avoid this type of interference that coincides with, or otherwise causes interference similar to, WiFi usage. Accordingly, the exemplary embodiments described above and herein related to WiFi interference based on the WiFi connection on the UE 105 may be representative of any interference that falls in a WiFi band (e.g., an ISM band) and may originate from any source.

As noted above, the aggregate AFH map may incorporate one or more of the identified AFH maps. For example, in a flexible situation, all of the identified AFH maps may be incorporated (e.g., scenarios 500, 700), one of the identified AFH maps may be omitted (e.g., scenarios 400, 600), more than one of the identified AFH maps may be omitted (e.g., scenario 800), or all of the identified AFH maps for the cellular connection may be omitted (e.g., scenario 900). For illustrative purposes, it may be assumed that the identified AFH maps and/or the aggregate AFH map have incorporated information available in the policy table 300 that indicates available Bluetooth channels when a particular cellular band is being used.

In 1015, the UE 105 determines whether the current conditions result in an available range of Bluetooth channels based on the aggregate AFH map and the identified AFH maps. The UE 105 may determine whether at least one of the identified AFH maps corresponding to the cellular interference may be incorporated in indicating whether there is a viable available range of Bluetooth channels (e.g., a number of available Bluetooth channels that exceeds a predetermined threshold). When the identified AFH maps corresponding to the cellular interference may not be incorporated, such a scenario may correspond to scenario 900. When there is no available range of Bluetooth channels based on the cellular interference, the UE 105 continues to 1020 where the UE 105 determines the best available Bluetooth antenna or defers to a default Bluetooth antenna. Based on this selection, in 1025, the UE 105 performs the wireless communication over the Bluetooth connection using the selected Bluetooth antenna.

Returning to 1015, if there is at least one available range of Bluetooth channels that exceeds the threshold, when incorporating the cellular interference, the UE 105 continues to 1030. In 1030, the UE 105 determines whether an option is available. That is, the option relates to whether the UE 105 is provided control over whether the upper Bluetooth antenna or the lower Bluetooth antenna may be selected. As noted above, the option may be available in at least the examples of scenarios 400, 500, 600, and 700. In contrast, the option may not be available in the example of scenario 800, as only one Bluetooth antenna is available to be selected in view of the other Bluetooth antenna not being a viable option. Thus, if there is no option available, in 1035, the UE 105 selects the indicated Bluetooth antenna (e.g., the lower Bluetooth antenna in scenario 800). Thereafter in 1025, the UE 105 performs the wireless communication over the Bluetooth connection using the selected Bluetooth antenna.

Returning to 1030, if there is an option available, the UE 105 continues to 1040. In 1040, the UE 105 determines whether a condition is applicable. For example, the condition may relate to whether one or more of the identified AFH maps corresponding to the cellular interference have been omitted in generating the aggregate AFH map. For example, scenarios 400 and 500 omitted an identified AFH map where the cellular interference (in conjunction with the WiFi interference) would result in the predetermined minimum number of available Bluetooth channels not being met. Thus, when the condition is present, in 1045, the UE 105 determines whether the condition has been met. For example, in the scenarios 400 and 500, the condition may be whether the upper cellular antenna is being used. If the condition has been met, the option of selecting between Bluetooth antennas no longer is available and selection of a predetermined Bluetooth antenna is forced. Accordingly, in 1035, the indicated Bluetooth antenna is selected and in 1025, the UE 105 performs the wireless communication over the Bluetooth connection using the selected Bluetooth antenna.

Returning to 1045, if the condition has not been met and the option of which Bluetooth antenna to select is still available, the UE 105 continues to 1050. Alternatively or additionally, returning to 1040, if there is no condition that applies to the current conditions, the UE 105 continues to 1050. In 1050, the UE 105 selects an available Bluetooth antenna using any known mechanism by which antenna selection may be performed. For example, the UE 105 may refer to a default selection. In another example, the UE 105 may consider the AFH maps corresponding to cellular interference and select the least likely interfered Bluetooth antenna. Thereafter, in 1025, the UE 105 performs the wireless communication over the Bluetooth connection using the selected Bluetooth antenna.

The exemplary embodiments provide a device, system, and method of coexistence based frequency hopping where a selection is made between at least two antennas of a UE for a given wireless connection type based on current conditions surrounding the UE. The current conditions may relate to further wireless connections and usage of antennas associated with these further wireless connections. Based on an expected interference from the wireless connections, the UE may determine the manner in which the antenna selection operation is to be performed. Specifically, the antenna selection operation may be selecting a default antenna, forcibly selecting one of the available antennas, or providing an option to select one of the available antennas. This antenna selection operation may be performed to decrease instances where packet drops occur as the situationally better antenna is selected in an initial selection and/or for ongoing selections.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Mac platform and MAC OS, a mobile device having an operating system such as iOS, Android, etc. In a further example, the exemplary embodiments of the above described method may be embodied as a program containing lines of code stored on a non-transitory computer readable storage medium that, when compiled, may be executed on a processor or microprocessor.

It will be apparent to those skilled in the art that various modifications may be made in the present invention, without departing from the spirit or the scope of the invention. Thus, it is intended that the present invention cover modifications and variations of this invention provided they come within the scope of the appended claims and their equivalent.

What is claimed is:

1. A method, comprising:
at a user equipment including an antenna arrangement comprising a first plurality of antennas configured for use with a first connection and a second plurality of antennas configured for use with a second connection:
determining, for each of a plurality of combinations of one of the first antennas and one of the second antennas, an individual expected interference limiting a number of usable channels for the first connection;
determining a combined expected interference based at least in part on at least one of the individual expected interferences; and
selecting, based at least in part on the combined expected interference, an operational antenna of the first plurality of antennas for communication associated with the first connection.

2. The method of claim 1, wherein the individual expected interferences are defined in respective individual adaptive frequency hopping (AFH) maps, and wherein the combined expected interference is defined in an aggregate AFH map.

3. The method of claim 2, wherein the individual AFH maps are predetermined and are generated using results from a controlled environment test.

4. The method of claim 1, wherein the user equipment is further configured to establish a third connection, the third connection having an exterior interference with respect to the first connection, and wherein the determining the combined expected interference is further based on the exterior interference.

5. The method of claim 4, wherein the third connection comprises a WiFi connection.

6. The method of claim 5, wherein the exterior interference has a priority over the individual expected interferences.

7. The method of claim 1, further comprising:
excluding a first individual expected interference from the determination of the combined expected interference when the number of usable channels for the first connection associated with the first individual expected interference is below a threshold.

8. The method of claim 7, wherein the first individual expected interference defines a condition for the selecting the one of the first plurality of antennas for the first connection.

9. The method of claim 8, wherein the selecting the one of the first plurality of antennas for the first connection is a forced selection when the condition is present.

10. The method of claim 9, wherein the selecting the one of the first plurality of antennas for the first connection is an optional selection in which any of the first plurality of antennas is capable of being selected when the condition is absent.

11. The method of claim 1, further comprising:
determining that each of the individual expected interferences result in the available number of total channels for the first connection being less than a predetermined threshold,
wherein the combined expected interference omits each of the individual expected interferences.

12. The method of claim 11, wherein the selecting the one of the first plurality of antennas for the first connection is a deferred selection to a default antenna.

13. The method of claim 1, further comprising:
determining that the individual expected interference for each of the plurality of combinations results in the number of usable channels for the first connection satisfying a predetermined threshold.

14. The method of claim 13, wherein the selecting the one of the first plurality of antennas for the first connection comprises an optional selection in which any of the first plurality of antennas is capable of being selected.

15. The method of claim 1, further comprising:
receiving policy information defining at least one of the usable channels that is available for a selected one of the combinations based on a selected channel of the second connection,
wherein the determining the combined expected interference is further based on the policy information.

16. The method of claim 1, wherein the first connection comprises a short-range communication connection and wherein the second connection comprises a cellular connection.

17. The method of claim 15, wherein the short-range communication connection comprises a Bluetooth connection.

18. The method of claim 1, wherein a shared antenna is included in each of the first plurality of antennas and the second plurality of antennas.

19. A user equipment, comprising:
a transceiver configured to establish a first connection and a second connection;
an antenna arrangement comprising a first plurality of antennas configured for use with a first connection and a second plurality of antennas configured for use with a second connection; and
a processor determining, for each of a plurality of combinations of one of the first antennas and one of the second antennas, an individual expected interference limiting a number of usable channels for the first connection, the processor determining a combined expected interference based at least in part on at least one of the individual expected interferences, the processor selecting, based at least in part on the combined expected interference, an operational antenna of the first plurality of antennas for communication associated with the first connection.

20. An integrated circuit, comprising:
circuitry for determining, for each of a plurality of combinations of one of a first plurality of antennas configured for use with a first connection and one of a second plurality of antennas configured for use with a second connection, an individual expected interference limiting a number of usable channels for the first connection;
circuitry for determining a combined expected interference based at least in part on at least one of the individual expected interferences; and
circuitry for selecting, based at least in part on the combined expected interference, an operational antenna of the first plurality of antennas for communication associated with the first connection.

* * * * *